United States Patent [19]
Rüegg

[11] Patent Number: 5,553,805
[45] Date of Patent: Sep. 10, 1996

[54] PROCESS AND APPARATUS FOR WINDING SHEET MATERIAL

[76] Inventor: Anton Rüegg, St. Gailerstrasse 34, 8716 Schmerikon, Switzerland

[21] Appl. No.: 348,888

[22] Filed: Nov. 25, 1994

[30] Foreign Application Priority Data

Nov. 26, 1993 [CH] Switzerland .................. 03 537/93

[51] Int. Cl.⁶ .................. B65H 18/08; B65H 18/16
[52] U.S. Cl. .................. 242/534; 242/541.7; 242/547; 242/598.5; 242/599.3
[58] Field of Search .................. 242/534, 539, 242/547, 598.5, 599.3, 542.3, 541.4, 541.5, 541.6, 541.7

[56] References Cited

U.S. PATENT DOCUMENTS

| | | |
|---|---|---|
| 3,236,471 | 2/1966 | Hornbostel .................. 242/541.7 |
| 4,632,325 | 12/1986 | Feyerl et al. .................. 242/547 X |
| 5,026,005 | 6/1991 | Ehrola .................. 242/547 X |
| 5,308,008 | 5/1994 | Ruegg . | |

FOREIGN PATENT DOCUMENTS

| | | |
|---|---|---|
| 0483093 | 4/1992 | European Pat. Off. . |
| 3527178 | 2/1987 | Germany . |
| 3627463 | 2/1988 | Germany . |
| 4017732 | 12/1991 | Germany . |
| 4103799 | 8/1992 | Germany . |
| 1438878 | 11/1988 | U.S.S.R. .................. 242/534 |

Primary Examiner—John M. Jillions
Attorney, Agent, or Firm—Oliff & Berridge

[57] ABSTRACT

A method for winding sheet material from a assisting roller onto a roll includes the step of exerting a compensating force in a compensating force direction on a shaft of the roll. The compensating force at least partially counteracts a bending stress in the shaft due to a gravitational force from the roll and/or a contact force from the source roll. The shaft includes two ends that are disposed to rotate on bearings. The bearings are spaced apart and disposed near the two ends. The space between the bearings defines a winding space of the roll. An apparatus for practicing the method is also disclosed.

34 Claims, 7 Drawing Sheets

PROCESS AND APPARATUS FOR WINDING SHEET MATERIAL

BACKGROUND OF THE INVENTION

The invention relates to a method of winding a roll of sheet material and, in particular, to a method of providing a force to compensate the forces exerted on the shaft of the roll so that the roll can be formed uniformly.

This method and the associated apparatus are suitable, in particular, for roller assemblies used in the production of plastic film, coated (especially adhesive-coated) film and paper material. The material is wound onto a shaft to form a roll. The material can be fed from a feeder roller or passed between a contact roller and the roll as the roll is wound on the shaft.

In the case of a conventional central winder, the material is fed over a feeder roller to a roll that is disposed on a driven shaft to ensure that the material is guided to form a uniform roll. A gap is usually maintained between the feeder roller and the roll. A gap having a constant width can be maintained by continuously adjusting the position of the feeder roller as the roll diameter increases. Alternatively, the central winder can be configured so that the position of the shaft, instead of the feeder roller, is corrected.

In a surface or contact winder, a contact or winding roller is driven and pressed against the roll. Because the contact roller contacts the roll, the contact roller is driven to rotate in the opposite direction. The surface winder is less suitable for sensitive web or film material, but is more suitable for high winding speeds.

During the production of heavy or wide films, the shaft bends as the roll diameter increases due to the weight of the roll. The bending is dependent on the ratio between the weight of the roll and the length and the diameter of the shaft. In the case of a relatively small shaft diameter of, e.g., 74 mm, and a film or roll width of, e.g., at least 2000 mm, the bending is so great that no uniform line of contact over the entire roll width exists between the roll and the contact roller. Accordingly, the roll becomes undesirably misshapen and the risk of trapping air and forming folds in the wound layers of material increases. In the case of films coated with an adhesive, pockets of air trapped between the layers can cause the roll to be rejected.

In the case of winding devices with a contact roller, the contact roller and the roll contact one another. Accordingly, a large contact force causes further bending in the shaft. Consequently, the bending caused by the weight of the roll and the bending caused by the contact force produce a resultant bending in the shaft along a resultant direction. Therefore, a satisfactory roll cannot be formed.

SUMMARY OF THE INVENTION

An object of the present invention is to provide a method and an apparatus for producing rolls of sheet material on a long shaft without allowing folds to form in the material because the shaft sags under the weight of the roll and, in some instances, the additional force exerted on the roll by a contact roller.

This and other objects are achieved by the present invention. The method for winding material from a assisting roller onto the roll includes the step of exerting a compensating force in a compensating force direction on the shaft of the roll. The compensating force at least partially counteracts a bending stress in the shaft due to a gravitational force from the roll and any contact force from the source roll. The shaft includes two ends that are disposed to rotate on bearings. The bearings are spaced apart and disposed near the two ends of the shaft. The space between the bearings defines a winding space of the roll.

The compensating force can be exerted as a supporting force, in which case the compensating force is applied to the shaft within the winding space (i.e., between the bearings) and, preferably, within the region between each bearing and each respective end of the roll. Alternatively, the compensating force can be applied as a loading force, in which case the compensation force is applied to the shaft between each bearing and each respective end of the shaft.

The assisting roller can be a contact roller that contacts and exerts a force upon the roll, or a feeder roller that is spaced apart from the roll. In the case of the contact roller, the compensating force counteracts the resultant force of the gravitational force exerted by the weight of the roll and the contact force exerted by the contact roller. The compensating force is applied in a compensating direction opposite the direction of the resultant force.

The compensating force and compensating direction can be controlled according to the bending stress of the shaft. The compensating force can be exerted on the shaft by one or more operating cylinders. In the case of a supporting force, at least two operating cylinders are preferably disposed to contact the shaft within the winding region between each bearing and each respective end of the roll. In the case of a loading force, a first end of each operating cylinder is attached to a bearing ring that is positioned over the shaft between each bearing and the respective end of the shaft. Accordingly, each of the cylinders can be actuated manually or automatically to exert the compensating force on the shaft.

The compensating direction can be controlled within a predetermined angular range. In one embodiment, a second end of each operating cylinder engages one of a series of holes in a slotted guide piece such that the operating cylinder is inclined to exert the compensating force upon the shaft in the desired compensation direction. The inclination of the operating cylinder can also be controlled automatically. Under automatic control according to one embodiment, the second end of each operating cylinder is connected to, e.g., a drive train having a worm gear that is connected to a motor. The motor drives the worm gear of the drive train to move the second end of the operating cylinder smoothly and continuously until the operating cylinder reaches a desired inclination.

The magnitude of the compensating force can also be controlled by a control device such that the compensating force exerted on the shaft is adjusted automatically. The control device can be of either an open-loop or a closed-loop type. In addition, a closed-loop type control device, together with an array of measuring sensors, can be connected to a computer. In this case, the control device controls the compensation force according to values measured by the measuring sensors. The measured values are transmitted by the computer to the control device. The measuring sensors can be disposed to measure, e.g., the bending stress and the compensating force. The compensating direction can also be determined by the computer.

The apparatus can also include a edge sensor and/or a bending sensor connected to the computer. The edge sensor is disposed to measure the diameter of the roll. The bending sensor is disposed to measure the bending of the roll and/or the shaft. The compensating force is determined based upon the values measured by the edge sensor and/or the bending sensor. As a result, the method and apparatus of the present invention ensure that a uniform roll can be produced.

BRIEF DESCRIPTION OF THE DRAWINGS

Exemplary embodiments of the invention are explained in more detail with reference to the drawings, in which.

DETAILED DESCRIPTION OF PREFERRED EMBODIMENTS

Figure 1:
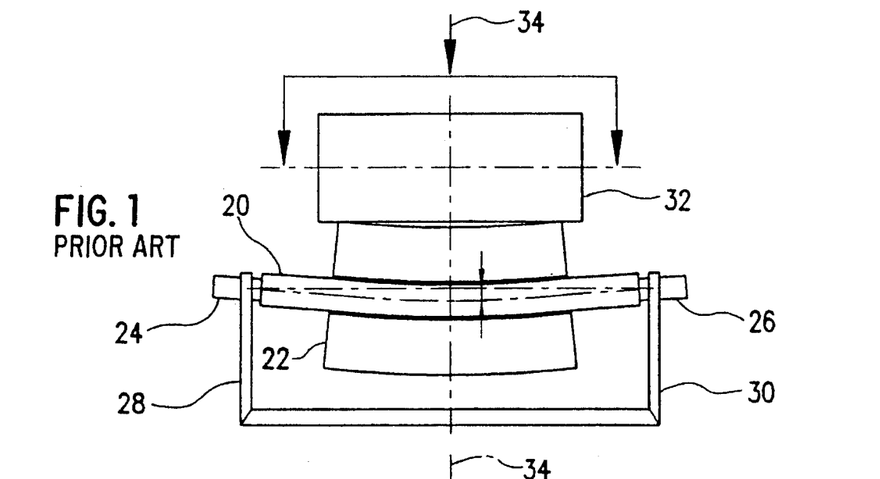
FIG. 1 shows a prior art winding apparatus with a contact roller for producing rolls of sheet material having a bent shaft due to loading.

In FIG. 1, a conventional winding apparatus having a shaft 20 with a roll 22 positioned on a core arranged thereon is shown. The shaft 20 is mounted in bearing supports 28,30. The bearing supports 28,30 are disposed near each end 24,26 of the shaft 20, respectively. The portion of the shaft 20 that extends between the bearing supports 28,30 defines a winding space. Sheet material (not shown) is fed to the roll 22 via a driven contact roller 32. The contact roller exerts a contact force in the direction of the arrow 34 in order to drive the roll 22 by the force of friction.

The weight of the roll 22 and the contact force due to the contact roller 32 cause the shaft 20 to bend. As shown in FIG. 1, in some instances the roll 22 is also bent such that compact winding is not possible. Accordingly, a warped roll results, and the chance that undesirable folds will form in the material is increased.

Figure 2:
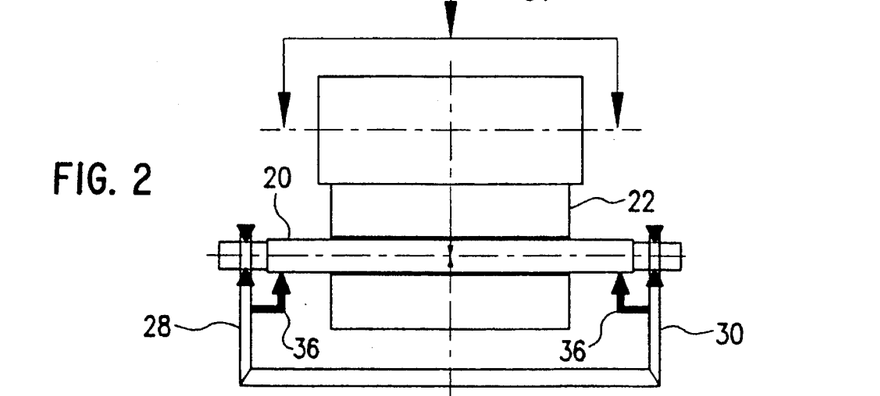
FIG. 2 shows the winding apparatus as shown in FIG. 1, except the bending of the shaft is counteracted by a supporting force exerted on the shaft between the bearings.

FIG. 2 shows a solution for eliminating the shortcomings of the conventional winding apparatus shown in FIG. 1. The bending stress exerted on the shaft 20 by the weight of the roll 22 and by the contact force is at least partially compensated by a compensating force that acts on the shaft 20 near each shaft end 24,26 on both sides of the winding space occupied by the roll 22. In this arrangement, the compensating force is exerted on the shaft 20 in the direction of the arrow 36 as a supporting force near the bearings and within the winding space.

Figure 3:
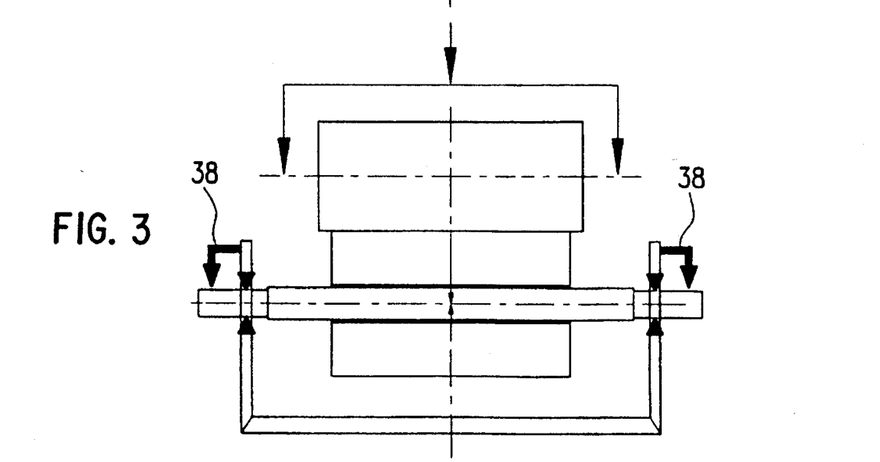
FIG. 3 shows the winding apparatus as shown in FIG. 1, except the bending of the shaft is counteracted by a loading force exerted between each bearing and each respective end of the shaft.

By way of contrast, FIG. 3 shows a winding apparatus in which a compensating force is exerted on the shaft 20 in the direction of the arrow 38 as a loading force between each bearing and each respective end 24,26, of the shaft 20 (i.e., outside the winding space). In either case, the compensating force counteracts the bending of the shaft 20 so that the shaft remains straight, and therefore, a warp-free roll can be obtained.

Figure 4:
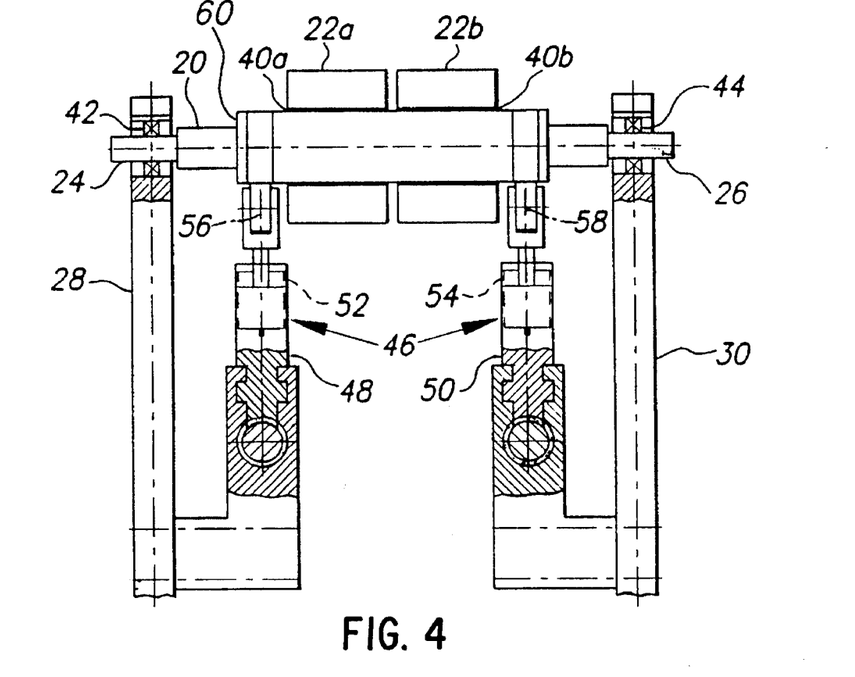
FIG. 4 shows a front view, partly in cross-section, of a winding apparatus in accordance with FIG. 2.

FIG. 4 shows an embodiment of the present invention according to FIG. 2. As an alternative, the roll in FIG. 4 is subdivided into two sub-rolls 22a and 22b, each having a winding core 40a, 40b, respectively. The shaft 20, which is shown in a shortened state for better clarity, is mounted near its ends 24,26 in bearings 42,44. Each of the bearings 42,44 is positioned in respective bearing supports 28,30.

In order to compensate the bending of the shaft 20, a compensating device 46 is provided. The compensating device 46 includes two supporting elements 48,50, each of which is provided with an operating cylinder 52,54, respectively. The operating cylinders 52, 54 urge respective supporting rollers 56,58 against the shaft 20. The shaft 20 includes a shoulder 60. Because the resulting support force is applied to the shaft 20 between the bearings 42,44 (i.e., within the winding space), this type of support is designated as inner compensation.

Figure 5:
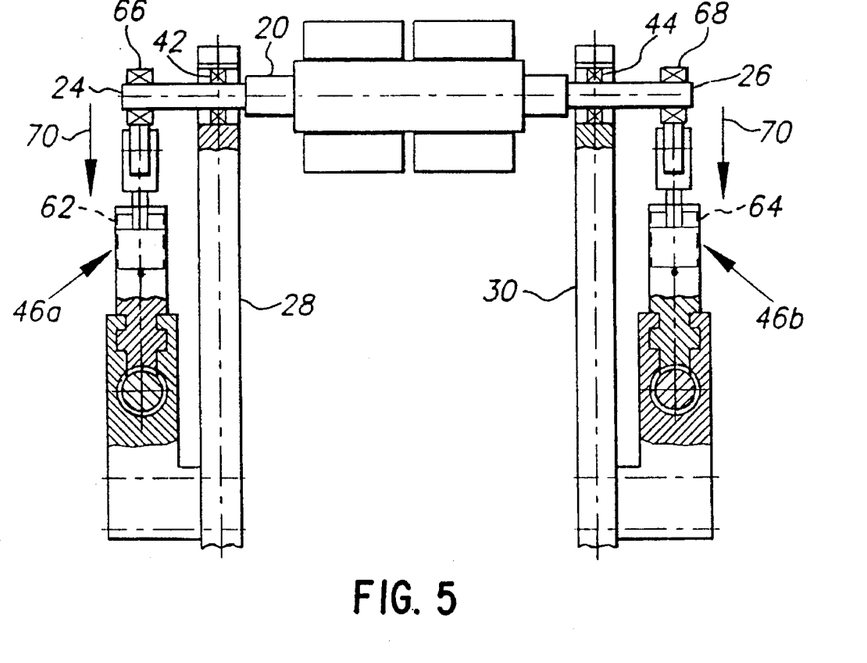
FIG. 5 shows a front view, partly in cross-section, of a winding apparatus in accordance with FIG. 3.

In contrast to FIG. 4, FIG. 5 shows an embodiment of an apparatus with outer compensation. In this arrangement, the compensating device includes parts 46a,46b. Each of the parts 46a,46b includes an operating cylinder 62,64, respectively. Each operating cylinder 62,64 includes a bearing ring 66,68, respectively. The bearing rings 66,68 pass over the ends 24,26, respectively, of the shaft 20 and transmit the compensating force from the operating cylinders in the direction of the arrow 70 to the shaft 20. Such an embodiment is advantageous if no space for a compensating device between the bearings 42,44 of the shaft 20 exists.

Figure 6:
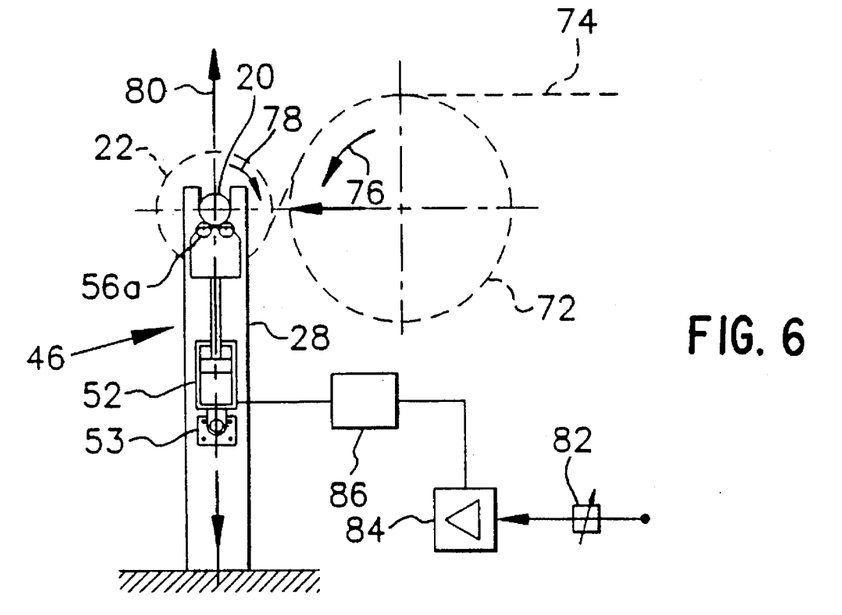
FIG. 6 shows a winding apparatus according to FIGS. 2 and 4, depicting a view of the inner side of a bearing support, a feeder roller spaced apart from the roll and a compensating device that compensates the weight of the roll together with an open-loop control device that controls the compensating force.

FIG. 6 shows the inner side of the bearing support 28. A feeder roller 72 that is spaced apart from the roll 22 feeds sheet material 74 to the roll 22. In this type of winding process, known as gap winding, both the feeder roller 72 and the shaft 20 are driven in the directions of arrows 76 and 78, respectively.

Because the shaft 20 is loaded exclusively by the weight of the roll 22 in gap winding, compensation is necessary only in the vertical direction 80. Accordingly, a compensation device 46 having a constantly acting operating cylinder 52 is used. The shaft 20 is supported by two supporting rollers 56a. The supporting force can be set on a set-point setter 82 that acts via an open-loop control device 84,86, on the operating cylinder fastened to a bearing support 28 by a fastening element 53.

Figure 7:
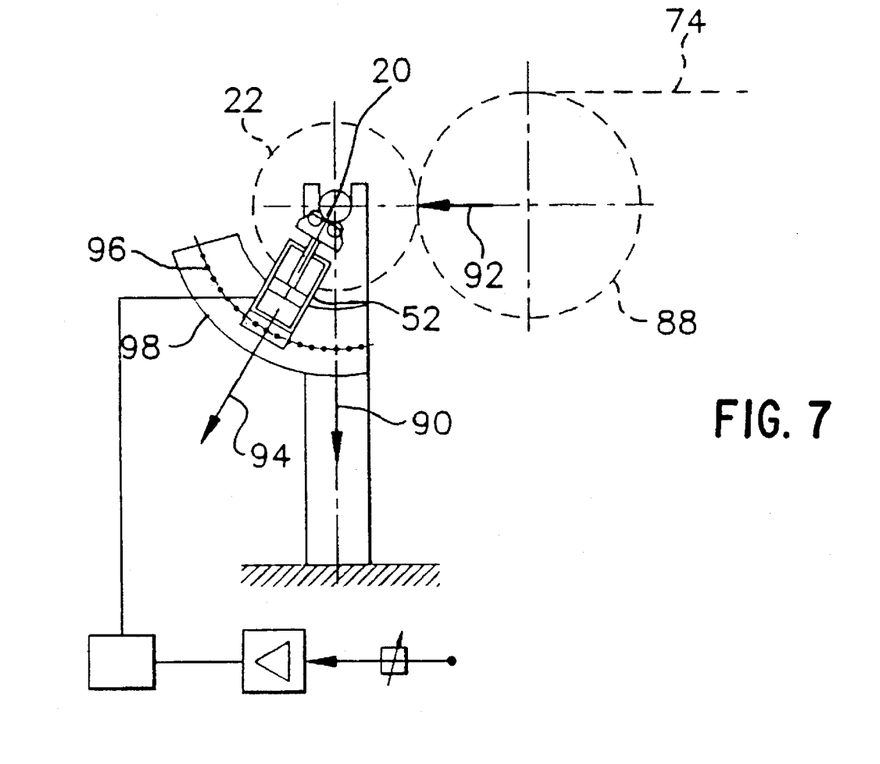
FIG. 7 shows a side view of a winding apparatus, depicting a contact roller in contact with the roll and a compensating device that compensates the weight of the roller and the contact force of the contact roller, together with an open-loop control device controlling the compensation force, in which the compensating direction can be manually adjusted in steps.

In contrast to FIG. 6, FIG. 7 shows a winding apparatus with a contact roller 88 that is pressed into contact with the roll 22 and over which the material 74 is fed. The weight of the roll 22 exerts a first gravitational force on the shaft 20 in the direction of the arrow 90. The contact roller 88 exerts a second contact force on the shaft 20 in the direction of the arrow 92. Accordingly, a single resultant force in the direction of the arrow 94 can be shown. The direction of the resultant force is displaced toward the arrow direction 90 as the roll diameter increases. In order to at least partially compensate the resultant force, the compensating direction of the compensating force applied by operating cylinder 52 can be adjusted by engaging one end of the operating cylinder 52 with one of a series of holes 96 disposed in a slotted-guide segment 38.

Figure 8:
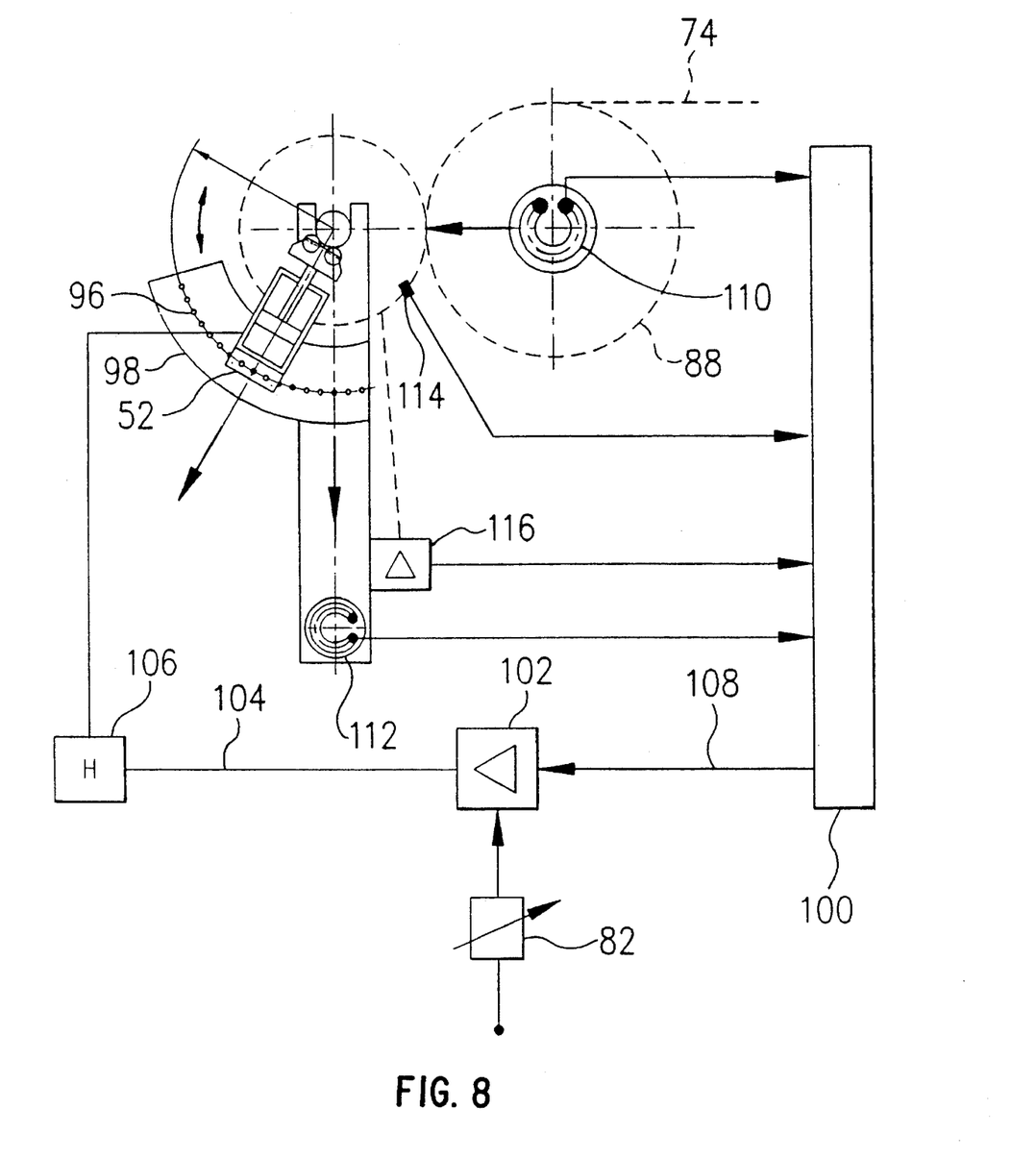
FIG. 8 shows a winding apparatus as shown in FIG. 7, but with a closed-loop control device controlling the compensating force.

FIG. 8 shows another embodiment of the winding apparatus shown in FIG. 7. In this arrangement, the necessary compensation force is determined by a computer unit 100 and is transmitted via a controller 102 and a control line 104 to an actuator 106 of the operating cylinder 52. The controller 102 compares the calculated value that is transmitted by the computer unit 100 via a control line 108, with a set value that has been predetermined in the set-value setter 82. The following measured values are transmitted to the computer unit 100 for evaluation: a first pressure sensor 110 detects the contact force exerted on the shaft 20 by the contact roller 88; a second pressure sensor 112 detects the gravitational force exerted on the bearing support 28 dependent upon the weight of the roll 22; an edge sensor 114 detects the diameter of the roll 22; and a contactless measuring sensor 116 detects the bending of the shaft 20. The contactless measuring sensor 116 may be, e.g., an ultrasound sensor, a laser or a potentiometer with mechanical sensor as are known in the art. According to these measured values, the computer unit 100 calculates the necessary compensation force to be applied to the shaft 20 by the operating cylinder 52.

Figure 9:
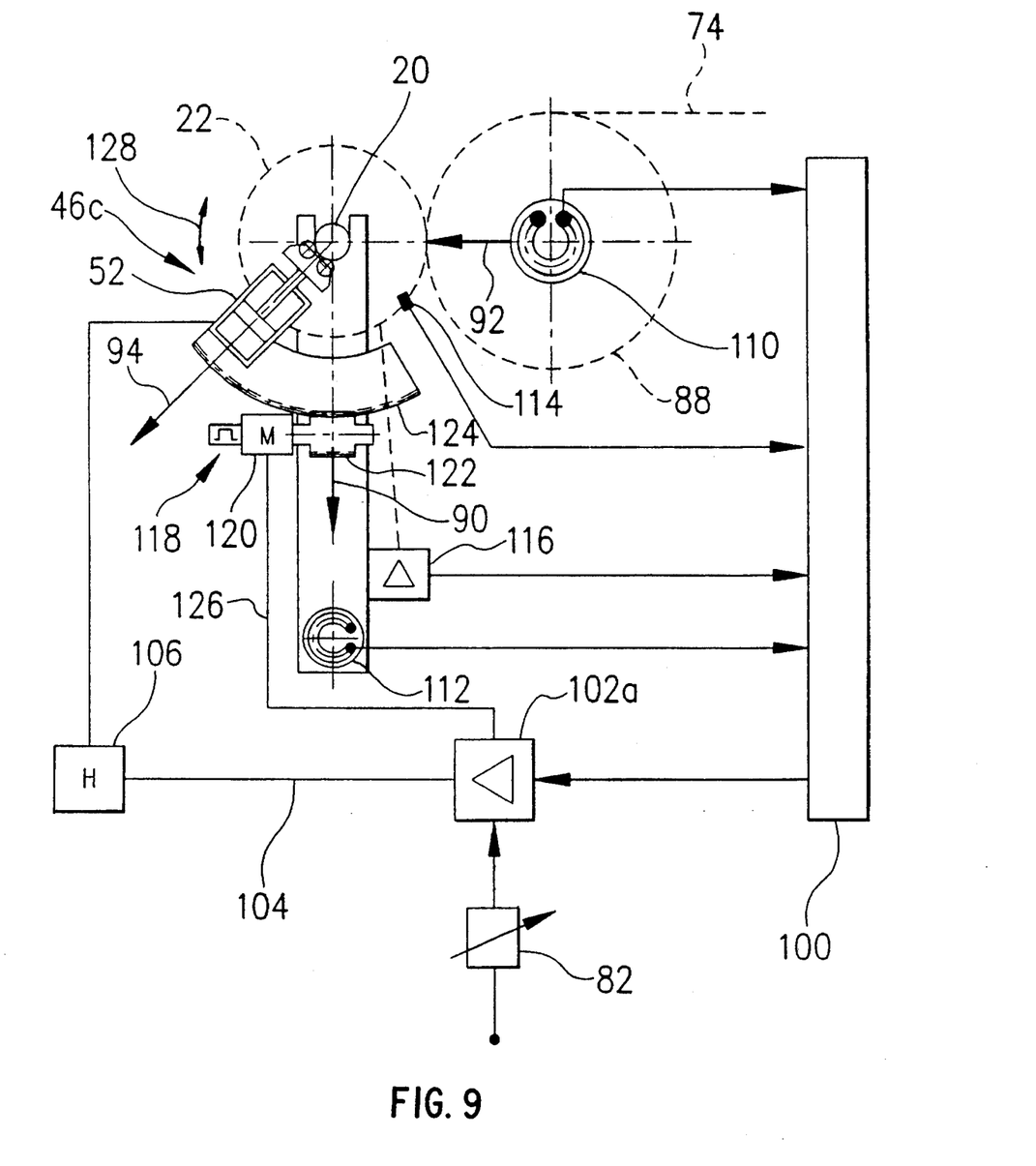
FIG. 9 shows a winding apparatus as shown in FIG. 8, but with a steplessly adjustable compensating direction.

The embodiment shown in FIG. 9 also includes an angle-adjustment device 118 for automatically and steplessly (i.e., smoothly) adjusting the angle of the operating cylinder 52 in order to counteract the resultant force in the direction of the arrow 94 that is exerted on the shaft 20. The angle-adjustment device 118 includes a worm gear 122 that can be driven by a motor 120 and can adjust the operating cylinder 52 via a worm-wheel segment 124.

In addition to the control of the operating cylinder 52, the motor 120 is controlled via a control line 126 by the controller 102a. The double arrow 128 designates an adjustment direction of the compensating device 46c. The compensating device 46c of this embodiment also includes the operating cylinder 52.

The compensation direction along which the compensation force must be applied to counteract the resultant force may also be computed by a sensor system that detects the sheet material width, the roll diameter, the material density and the contact force exerted by the contact roller. These parameters are measured via the sensor system and compared with predetermined set values.

Direct control of the compensation device 46c is achieved by using an optical or mechanical edge sensor 114 that laterally senses the diameter of the roll 22. The edge sensor 114 may be guided on a linear unit (not shown) arranged laterally on the compensating device 46c. The second sensor 116 on this device measures the bending of the roll 22. The resultant can be determined laterally via a measuring system that measures the highest point of eccentricity of the bent shaft 20. The compensating device thus provides the compensating force in the appropriate compensating force direction.

Figure 10:
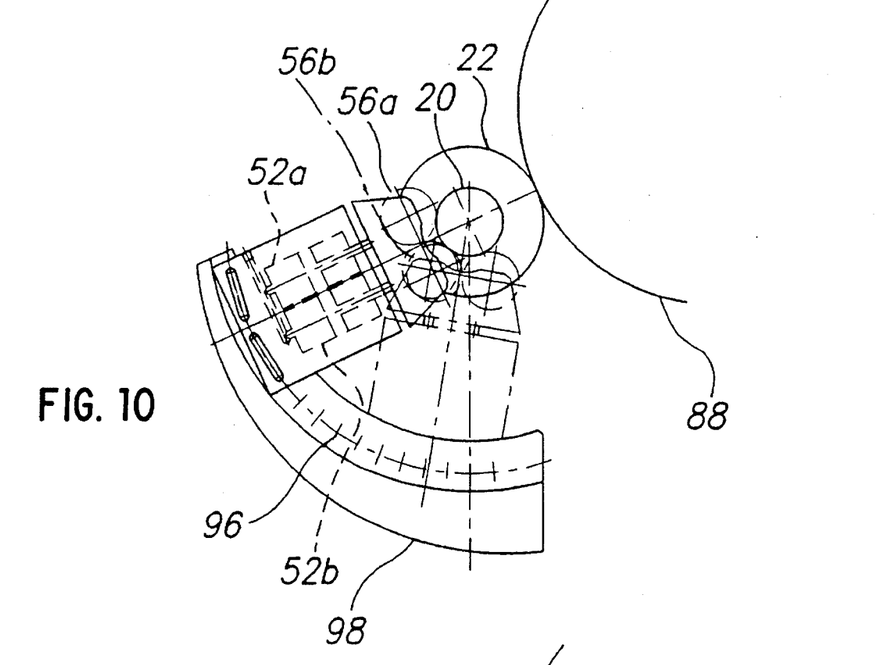
FIG. 10 shows a supporting element that acts on a shaft, can be adjusted in steps along a range of action, and has two supporting cylinders.
Figure 11:
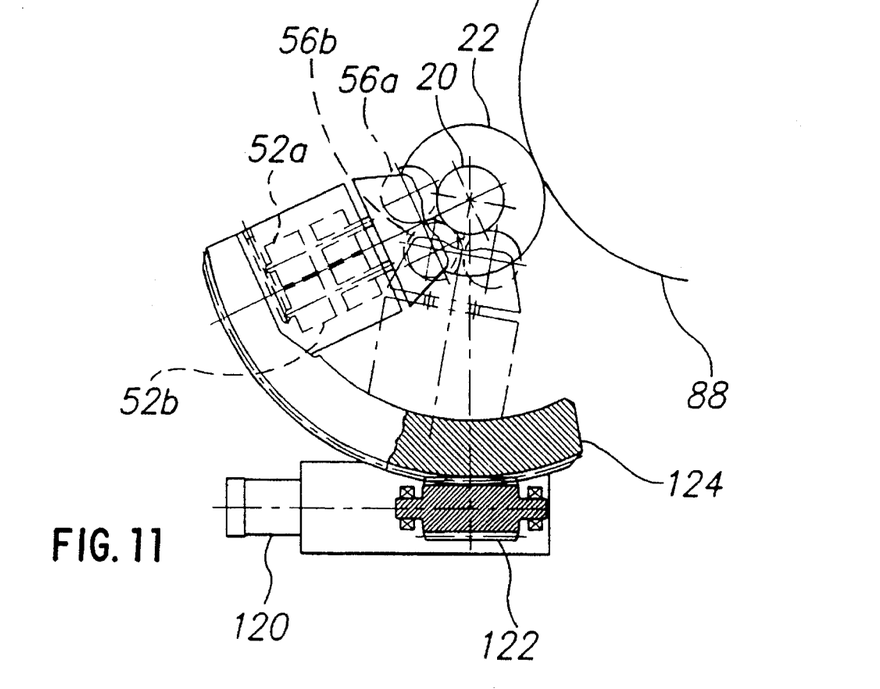
FIG. 11 shows a supporting element that acts on a shaft, can be adjusted steplessly along a range, and has two supporting cylinder.
Figure 12:
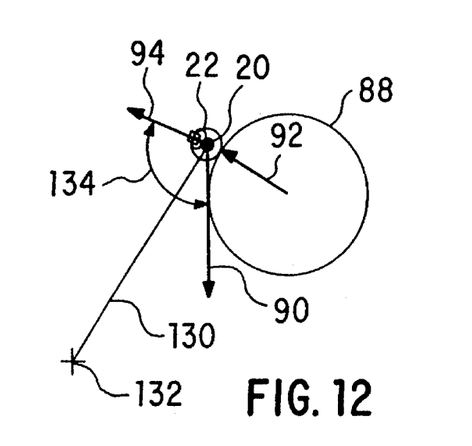
FIGS. 12–15 show force diagrams of the forces exerted on the shaft as a roll begins to form, increase in size, increase further in size, and increase to full size, respectively.
Figure 13:
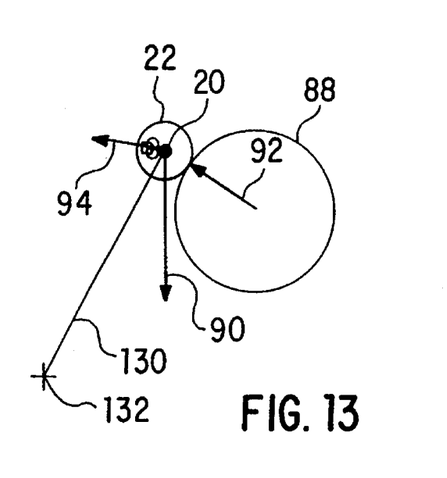
Figure 14:
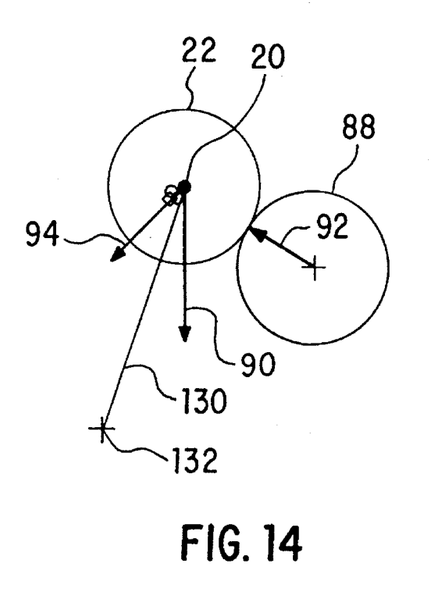
Figure 15:
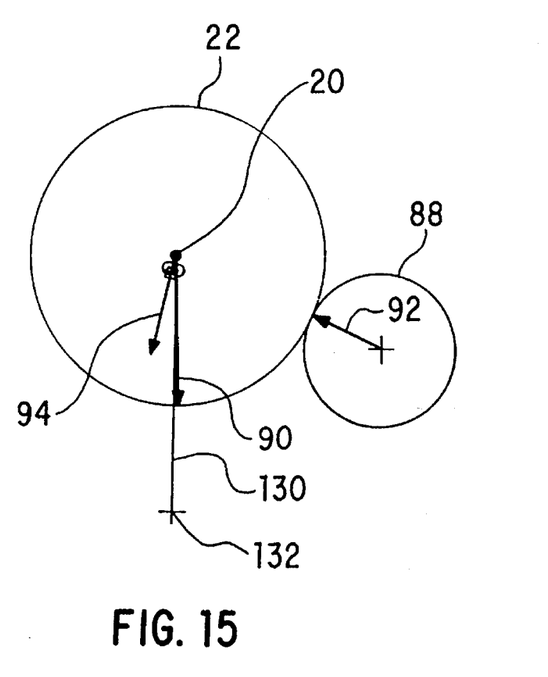

FIGS. 10 and 11 show details from FIGS. 8 and 9, but with two parallel operating cylinders 52a,52b instead of only one operating cylinder on each side. Each of these operating cylinders 52a,52b actuates a supporting roller 56a,56b in order to exert a compensating support force on the shaft 20.

FIGS. 12 to 15 depict the changing resultant direction 94 as the diameter of the roll 22 increases. In the case of a small roll diameter according to FIG. 12, the contact force applied by the contact roller 88 in the contact force direction 92 dominates. In the case of the large roll diameter according to FIG. 15, however, the gravitational force due to the weight of the roll 22 is dominant. For complete compensation of the resultant force, the compensating force must be corrected with respect to the direction of the resultant force.

In the case of an arrangement according to FIGS. 12 to 15, the contact roller 88 is mounted in a stationary manner. In this arrangement, in order to compensate the increasing diameter of the roll 22, the shaft 20 is mounted on pivotable lever arms, symbolically shown as reference numeral 130. The lever arms can be pivoted about a fixed pivot axis 132.

Since other modifications and changes varied to suit particular operating requirements will be apparent to those skilled in the art, the present invention is not considered to be limited to the examples chosen for the purpose of disclosure, and thus covers all changes to the invention that do not constitute a departure from its true spirit and scope.

What is claimed is:

1. A method for winding sheet material from an assisting roller onto a roll carried on a shaft, said shaft having two ends and being disposed to rotate on bearings, said bearings being spaced apart and disposed near said two ends to define a winding space between said bearings, wherein at least one of a gravitational force of said roll and a contact force from said assisting roller exert a bending stress on said shaft, said method comprising the steps of:

exerting a compensating force on said shaft within said winding space adjacent said bearings; and directing said compensating force in a compensating direction to at least partially counteract said bending stress.

2. The method of claim 1, wherein said assisting roller is a contact roller that contacts and exerts a contact force on said roll, and wherein said compensating force counteracts a resultant force from said contact force and said gravitational force and said compensating direction extends at a resultant angle between a direction of said contact force and said gravitational force.

3. The method of claim 1, further comprising the step of controlling said compensating force according to said bending stress of said shaft.

4. The method of claim 2, further comprising the step of controlling said compensating direction according to said resultant angle of said resultant force acting on said shaft.

5. A sheet winding apparatus for winding sheet material from an assisting roller onto a roll carried on a shaft, said shaft having two ends and being disposed to rotate on bearings, said bearings being spaced apart and disposed near said two ends to define a winding space between said bearings, said sheet winding apparatus comprising:

exerting means for exerting a compensating force on said shaft adjacent said bearings within said winding space, said exerting means including two compensation units, each of said two compensation units including a supporting roller disposed adjacent one of said bearings in contact with at least one of said shaft and said roller and connected to at least one operating cylinder, wherein said operating cylinder transmits said compensating force through said support roller to said shaft; and directing means for directing said compensating force in a compensating direction to at least partially counteract a bending stress exerted on said shaft.

6. The apparatus of claim 5, wherein said directing means is adjustable such that said compensating direction of said compensating force exerted on said shaft can be varied within a predetermined angular range.

7. The apparatus of claim 6, wherein each operating cylinder includes a first end and a second end, said first end being disposed to contact said shaft, said second end being selectively engageable with one of a plurality of apertures in a slotted guide piece, wherein said directing means directs said compensating force in said compensating direction along a direction between said first end and said second end connected to said slotted guide piece.

8. The apparatus of claim 6, wherein each operating cylinder includes a first end and a second end, said first end being disposed to contact said shaft, said second end being connected to a drive train, said drive train having a worm gear and being connected to a motor, and wherein said motor drives said worm gear of said drive train such that said second end moves along a continuous path, thereby enabling said compensating direction to be selectively set.

9. The apparatus of claim 5, further comprising a control device that detects and controls said compensating force, wherein said compensating force exerted by said two compensation units on said shaft is adjusted according to said control device.

10. The apparatus of claim 9, wherein said control device is one of an open-loop type and a closed-loop type.

11. The apparatus of claim 9, wherein said control device is a closed-loop type connected to a computer, said apparatus further comprising measuring sensors connected to said computer that detect measured values relating to at least one of said bending stress and said compensating force, and wherein said control device controls said compensation force according to said measured values detected by said measuring sensors.

12. The apparatus of claim 5, further comprising a control device that detects and controls said compensating force, wherein said compensating force exerted by said two compensation units on said shaft is adjusted according to said control device.

13. The apparatus of claim 12, wherein said control device is one of an open-loop type and a closed-loop type.

14. The apparatus of claim 12, wherein said control device is a closed-loop type connected to a computer, said apparatus further comprising measuring sensors connected to said computer that detect measured values relating to at least one of said bending stress and said compensating force, and wherein said control device controls said compensation force according to said measured values detected by said measuring sensors.

15. The apparatus of claim 8, further comprising a control device connected to a computer and to said motor, wherein said computer determines said compensating direction and said control device controls said motor such that said compensating force is exerted by said operating cylinder on said shaft in accordance with said compensating direction determined by said computer.

16. The apparatus of claim 15, further comprising at least one of an edge sensor and a bending sensor, said at least one of an edge sensor and a bending sensor being connected to said computer, said edge sensor being disposed to measure a diameter of said roll, said bending sensor being disposed to measure bending of at least one of said roll and said shaft, wherein said control device controls said compensation force according to at least one of said diameter measured by said roll edge sensor and said bending measured by said bending sensor.

17. A method for winding sheet material from a assisting roller onto a roll carried by a shaft and in contact with said assisting roller, said shaft having two ends and being disposed to rotate on bearings, said bearings being spaced apart and disposed near said two ends to define a winding space between said bearings, wherein a gravitational force of said roll and a contact force exerted by said assisting roller exert a bending stress on said shaft, said method comprising the steps of:

exerting a compensating force on said shaft adjacent said bearings to compensate a resultant force extending at a resultant angle between said contact force and said gravitational force; and directing said compensating force in a compensating direction opposite a direction of said resultant force to at least partially counteract said bending stress.

18. The method of claim 17, wherein said compensating force is a supporting force exerted on said shaft within said winding space.

19. The method of claim 17, wherein said compensating force is a loading force exerted on said shaft in a region between each of said bearings and each of said two ends, respectively.

20. The method of claim 17, further comprising the step of controlling said compensating force according to said bending stress of said shaft.

21. The method of claim 17, further comprising the step of controlling said compensation according to said resultant angle of said resultant force acting on said shaft.

22. A sheet winding apparatus for winding sheet material from an assisting roller onto a roll carried on a shaft, said shaft having two ends and being disposed to rotate on bearings, said bearings being spaced apart and disposed near said two ends to define a winding space between said bearings, said sheet winding apparatus comprising:

exerting means for exerting a compensating force on said shaft adjacent said bearings to compensate a resultant force applied at a resultant angle between said contact force and a gravitational force; and directing means for adjustably directing said compensating force in a compensating direction within a predetermined angular range opposite a direction of said resultant force to at least partially counteract a bending stress exerted on said shaft.

23. The apparatus of claim 22, wherein said exerting means includes at least one supporting roller disposed within said winding space, said supporting roller being connected to an operating cylinder and disposed to contact at least one of said shaft and said roller, said operating cylinder transmitting said compensating force through said support roller to said shaft.

24. The apparatus of claim 22, wherein said exerting means includes bearing rings coupled to each of said two ends of said shaft, said bearing rings being disposed between said bearings and each of said two ends, said bearing rings being connected to operating cylinders that transmit said compensating force through said bearing rings to said shaft.

25. The apparatus of claim 22, wherein said exerting means includes at least one operating cylinder having a first end and a second end, said first end being disposed to contact said shaft, said second end being selectively engageable with one of a plurality of apertures in a slotted guide piece, wherein said directing means directs said compensating force in said compensating direction along an angle between said first end and said second end connected to said slotted guide piece.

26. The apparatus of claim 22, wherein said exerting means includes at least one operating cylinder having a first end and a second end, said first end being disposed to contact said shaft, said second end being connected to a drive train, said drive train having a worm gear and being connected to a motor, and wherein said motor drives said worm gear of said drive train such that said second end moves along a continuous path, thereby enabling said compensating direction to be selectively set.

27. The apparatus of claim 23, further comprising a control device that detects and controls said compensating force, wherein said compensating force exerted by said at least one operating cylinder on said shaft is adjusted according to said control device.

28. The apparatus of claim 27, wherein said control device is one of an open-loop type and a closed-loop type.

29. The apparatus of claim 27, wherein said control device is a closed-loop type connected to a computer, said apparatus further comprising measuring sensors-connected to said computer that detect measured values relating to at least one of said bending stress and said compensating force, and wherein said control device controls said compensation force according to said measured values detected by said measuring sensors.

30. The apparatus of claim 24, further comprising a control device that detects and controls said compensating force, wherein said compensating force exerted by said at least one operating cylinder on said shaft is adjusted according to said control device.

31. The apparatus of claim 30, wherein said control device is one of an open-loop type and a closed-loop type.

32. The apparatus of claim 30, wherein said control device is a closed-loop type connected to a computer, said apparatus further comprising measuring sensors connected to said computer that detect measured values relating to at least one of said bending stress and said compensating force, and wherein said control device controls said compensation force according to said measured values detected by said measuring sensors.

33. The apparatus of claim 26, further comprising a control device connected to a computer and to said motor, wherein said computer determines said compensating direction and said control device controls said motor such that said compensating force is exerted by said operating cylinder on said shaft in accordance with said compensating direction determined by said computer.

34. The apparatus of claim 33, further comprising at least one of an edge sensor and a bending sensor, said at least one of an edge sensor and a bending sensor being connected to said computer, said edge sensor being disposed to measure a diameter of said roll, said bending sensor being disposed to measure bending of at least one of said roll and said shaft, wherein said control device controls said compensation force according to at least one of said diameter measured by said roll edge sensor and said bending measured by said bending sensor.

* * * * *